(12) United States Patent
Breault

(10) Patent No.: US 7,179,557 B2
(45) Date of Patent: Feb. 20, 2007

(54) DIRECT ANTIFREEZE COOLED FUEL CELL POWER PLANT WITH PASSIVE WATER MANAGEMENT

(75) Inventor: Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 300 days.

(21) Appl. No.: 10/748,473

(22) Filed: Dec. 30, 2003

(65) Prior Publication Data

US 2005/0142408 A1    Jun. 30, 2005

(51) Int. Cl.
*H01M 8/04* (2006.01)
*H01M 2/02* (2006.01)
*H01M 2/08* (2006.01)

(52) U.S. Cl. ............................. 429/26; 429/34; 429/35

(58) Field of Classification Search ................... 429/26, 429/34, 35
See application file for complete search history.

(56) References Cited

U.S. PATENT DOCUMENTS 6,316,135 B1    11/2001    Breault et al.
6,361,891 B1    3/2002    Breault et al.
6,365,291 B1    4/2002    Margiott
6,416,891 B1 *  7/2002    Condit et al. ................. 429/13
6,416,892 B1 *  7/2002    Breault ......................... 429/13
6,432,566 B1    8/2002    Condit et al.
6,461,753 B1 * 10/2002    Breault et al. ................ 429/26
6,562,503 B2    5/2003    Grasso et al.

OTHER PUBLICATIONS

U.S. Appl. No. 10/194,122, Michels et al.

* cited by examiner

*Primary Examiner*—Dah-Wei Yuan
(74) *Attorney, Agent, or Firm*—Malcolm J. Chisholm, Jr.

(57) ABSTRACT

The plant (60) includes at least one fuel cell (10, 62) having a wetproofed anode support (20) and a cathode support (24) for directing reactant streams adjacent catalysts (14, 16). A porous anode cooler plate (26) has its fuel channels (28A, 28B, 28C, 28D) secured adjacent the anode support (20). A porous cathode water management plate (38) has its oxidant channels (40A, 40B, 40C, 40D) secured adjacent the cathode support (24). A direct antifreeze solution passes only through coolant channels (32A, 32B, 32C, 32D) of the anode cooler plate (26) so the solution cannot poison the catalysts (14, 16), while fuel cell product water flows passively through the water management plate (38) and water management channels (44A, 44B, 44C, 44D) defined in the plate (38) to humidify reactant streams and be discharged from the fuel cell (62).

7 Claims, 2 Drawing Sheets

DIRECT ANTIFREEZE COOLED FUEL CELL POWER PLANT WITH PASSIVE WATER MANAGEMENT

TECHNICAL FIELD

The present invention relates to fuel cell power plants that are suited for usage in transportation vehicles, portable power plants, or as stationary power plants, and the invention especially relates to a fuel cell power plant having fuel cells cooled by a direct antifreeze solution and having water managed within the cells passively without use of a water circulating pump.

BACKGROUND ART

Fuel cell power plants are well known and are commonly used to produce electrical current from hydrogen containing reducing fluid fuel and oxygen containing oxidant reactant streams to power electrical apparatus such as power plants and transportation vehicles. In fuel cell power plants of the prior art, it is known that thermal and water management of fuel cells typically includes circulating a coolant through the fuel cells to remove heat during operation of the cells, and to add heat during a start-up procedure. It is also known to utilize porous water transport plates adjacent porous catalyst support layers in fuel cells utilizing a proton exchange membrane ("PEM") electrolyte.

The porous water transport plates typically define coolant and reactant stream channels on opposed sides of the plates for transporting a coolant through the cell, and for providing the reducing fluid fuel and oxidant reactant streams to the cell anode and cathode catalysts. Product water generated during operation of the fuel cells and any condensed water from saturated reactant streams typically moves through such porous water transport plates and into coolant channels of the plates to be transported out of the fuel cell with the circulating coolant.

Operation of such fuel cell power plants in conditions where ambient temperatures decline to below the freezing temperature of water gives rise to significant thermal and water management issues. For example, coolants including traditional antifreeze solutions of ethylene glycol and water or propylene glycol and water will diffuse through the porous water transport plates and catalyst support layers to be adsorbed by and poison the fuel cell catalysts. Additionally, such antifreeze solutions have low surface tensions resulting in wetting of any wetproofed catalyst support layers, thereby impeding diffusion of the reactant streams through the porous support layers to the catalysts. Those antifreezes also have high vapor pressures resulting in evaporation and loss of traditional antifreeze solutions in fuel cell exhaust streams or fuel cell power plant support systems.

It is known to utilize alternative antifreeze solutions to minimize the described limitations of those traditional antifreeze solutions. In particular, a variety of "direct antifreeze solutions" are disclosed for use in fuel cell power plants in U.S. Pat. Nos. 6,316,135, 6,361,891, 6,365,291, 6,416,891 6,432,566, and 6,461,753, and in U.S. patent application Ser. No. 10/194,122, which Patents and Application are owned by the owner of all rights in the present invention. The direct antifreeze solutions are in essence organic antifreeze solutions that are non-volatile at fuel cell operating temperatures. Because such direct antifreeze solutions are non-volatile, they are circulated through porous water transport plates in "direct fluid communication" with the fuel cell catalysts without volatilizing to contact and poison the fuel cell catalysts, or to leave the plant in exhaust streams.

It has been determined however, that while the direct antifreeze solutions enhance performance of such plants, the performance of the plants is still not the same as performance with pure water as the coolant. Additionally, operation of fuel cell power plants with such direct antifreeze solutions still requires active water management to humidify reactant streams and to remove fuel cell product water. That is typically achieved through a coolant loop wherein the fuel cell product water is mixed with the direct antifreeze solution and water in the coolant solution humidifies the reactant streams. As disclosed in the aforesaid U.S. Pat. No. 6,365, 291, controlling concentrations of the direct antifreeze solution within a complex coolant stream requires a concentration control system involving power from the plant for active pumping of fuel cell product water, and increased volume, weight and cost of the system components.

Circulating fuel cell product water as part of a thermal management system also gives rise to substantial difficulties in storing significant volumes of water when a fuel cell power plant is shut down in ambient temperatures below the freezing temperature of water. For example and as disclosed in U.S. Pat. No. 6,562,503, which Patent is owned by the owner of all rights in the present invention, a large volume of fuel cell product water utilized as a fuel cell coolant may be stored in a freeze tolerant accumulator along with a water immiscible fluid antifreeze solution that is used to thaw frozen water within the accumulator during a start-up procedure. Such a freeze tolerant fuel cell power plant also gives rise to increased parasitic power from the plant, and increased volume, weight and cost.

Consequently, there is a need for a fuel cell power plant that minimizes components required for circulating a coolant, and that minimizes a total volume of water within the plant.

DISCLOSURE OF INVENTION

The invention is a fuel cell power plant for generating electrical current from reducing fluid fuel and oxygen containing oxidant reactant streams. The plant includes at least one fuel cell having an electrolyte secured between an anode catalyst and a cathode catalyst, a wetproofed anode support means secured in direct fluid communication with the anode catalyst for passing the fuel reactant stream adjacent the anode catalyst, and a cathode support means secured in direct fluid communication with the cathode catalyst for passing the oxidant reactant stream adjacent the cathode catalyst. A porous anode cooler plate defines fuel channels on a first surface and coolant channels on an opposed second surface of the cooler plate. The anode cooler plate is secured adjacent the porous anode support means so that the fuel channels are adjacent the anode support means. A direct antifreeze solution circulates through the coolant channels for cooling the fuel cell. An impervious separator plate is secured adjacent the coolant channels of the anode cooler plate for prohibiting movement of the direct antifreeze solution through the separator plate.

A porous cathode water management plate defines oxidant channels on a first surface and water management channels on an opposed second surface and is secured adjacent the cathode support means so that the oxidant channels of the plate are adjacent the cathode support means. The cathode plate is also secured so that fuel cell product water flows through the cathode support means and into and through pores of the plate and then into the water management channels of the plate. The water management channels are constructed to be in fluid communication with a fuel cell water discharge for discharging water out of the fuel cell.

The power plant also includes a pressure control system for maintaining a positive pressure differential between the fuel stream passing through the fuel channels of the porous anode cooler plate and the direct antifreeze passing through the coolant channels of the anode cooler plate. The positive pressure differential facilitates movement of any condensed water from the fuel reactant stream into the coolant channels and into the direct antifreeze solution, and restricts movement of the direct antifreeze from the porous anode cooler plate into the anode support layers and anode catalyst. The pressure control system may also maintain a positive pressure differential between the oxidant stream passing through the oxidant channels of the cathode water management plate and the product water passing through the pores and water management channels of the water management plate in order to facilitate movement of fuel cell product water and any condensed water within the oxidant stream away from the cathode support layers and cathode catalyst and into the cathode water management plate to avoid flooding of the cathode catalyst and to remove excess fuel cell product water out of the fuel cell.

Use of the impervious separator plate and wetproofed anode support means prohibits movement of the direct antifreeze solution out of the anode cooler plate so that the direct antifreeze solution cannot contact and poison the cathode catalyst. By directing the fuel cell product water to flow through the porous cathode water management plate by capillary action and by the pressure differential and through the water management channels to be discharged out of the fuel cell, no mechanical pump is necessary for circulating the water. Additionally, the fuel cell product water and condensed water within the oxidant stream move by capillary action from a condensation zone of the cathode water management plate adjacent an oxidant discharge line to a humidification zone of the plate adjacent an oxidant feed line to passively humidify the oxidant stream entering the oxidant channels. Because the fuel cell product water is not used for cooling the fuel cell, a large volume of water is not retained within the plant and therefore no freeze tolerant accumulator is necessary for storing the water in sub-freezing ambient conditions.

In a preferred embodiment, the fuel cell power plant includes a coolant loop that directs flow of the direct antifreeze solution from the coolant channels of the porous anode cooler plate through a coolant pump, an evaporator and a radiator and back to the cooler plate to control a concentration of and cool the direct antifreeze solution. An oxidant recycle line may also direct a portion of heated oxidant from the oxidant discharge line into the evaporator to facilitate evaporation of any water from the direct antifreeze solution. In varying embodiments, the pressure control system may consist of restriction valves on anode and cathode exhausts combined with a pressurized reducing fluid source and an oxidant blower to elevate the pressure of the reactant streams within the fuel cell. Additionally, a pressure control valve may be utilized on a coolant feed line to reduce pressure of the direct antifreeze solution within the fuel cell.

Accordingly, it is a general purpose of the present invention to provide a direct antifreeze cooled fuel cell power plant with passive water management that overcomes deficiencies of the prior art.

It is a more specific purpose to provide a direct antifreeze cooled fuel cell power plant with passive water management that does not require a circulating mechanical pump or a freeze tolerant accumulator for management of fuel cell product water.

It is yet another purpose to provide a direct antifreeze cooled fuel cell power plant with passive water management that restricts liquid contact between the direct antifreeze solution and cathode catalysts of fuel cells of the plant.

These and other purposes and advantages of the present direct antifreeze fuel cell power plant with passive water management will become more readily apparent when the following description is read in conjunction with the accompanying drawings.

DESCRIPTION OF THE PREFERRED EMBODIMENTS

Figure 1:
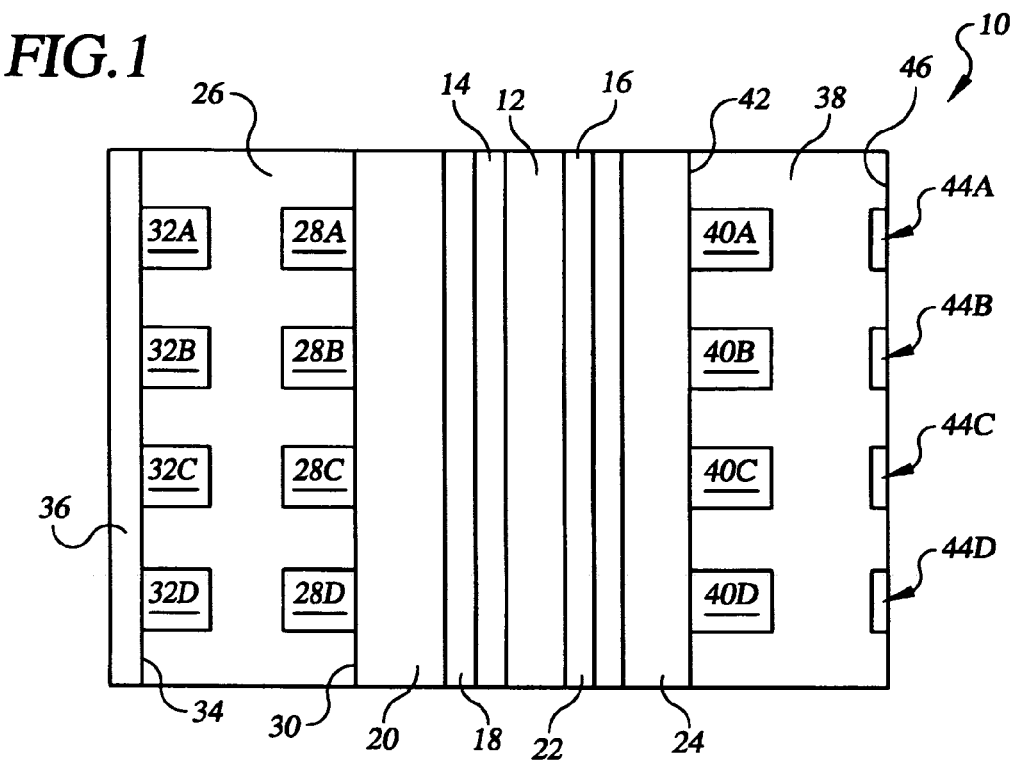
FIG. 1 is a schematic, fragmentary, cross-sectional representation of a fuel cell appropriate for a fuel cell power plant of the present invention.

Referring to the drawings in detail, a fuel cell 10 is shown in FIG. 1 that is constructed in accordance with the present invention. The fuel cell 10 includes an electrolyte 12, such as a proton exchange membrane ("PEM") secured between an anode catalyst 14 and a cathode catalyst 16 in a manner well known in the art. A porous anode diffusion layer 18 is secured adjacent the anode catalyst 14 and a porous anode substrate 20 is secured adjacent the diffusion layer 18. In the preferred embodiment shown in FIG. 1, both the anode diffusion and substrate layers 18, 20 are utilized, and they typically consist of a carbon black-hydrophobic polymer and porous carbon-carbon fibrous composite layers well known in the art as described in the aforesaid patents. However, in alternative embodiments, the anode catalyst 14 may be supported by only one of the two layers 18, 20. Additionally, at least one of the anode diffusion layer 18, the anode substrate layer 20 or both layers may be wetproofed to restrict movement of liquid water through the layers. This may be done by application of a hydrophobic substance such as polytetrafluoroethylene to a concentration of about 0.4 grams per cubic centimeter ("cc") to the carbon-carbon composite. The wetproofing is achieved in a manner known in the art and, for example, described in the aforesaid U.S. Pat. No. 6,316,135. For purposes herein, "about" means plus or minus twenty percent. For convenience, the phrase "wetproofed anode support means for passing the fuel reactant stream adjacent the anode catalyst" is to be understood to include a single wetproofed layer alone, such as either the anode diffusion layer 18 or anode substrate layer 20; a single wetproofed layer 18 or 20 combined with a non-wetproofed layer 18 or 20; or both of those layers 18, 20 being wetproofed.

The fuel cell 10 also includes a cathode diffusion layer 22 and a cathode substrate layer 24, which will also be referred to for convenience as a "cathode support means for passing the oxidant reactant stream adjacent the cathode catalyst". The cathode support means includes either or both layers 22, 24. For the purposes of this invention, the described anode support means is always wetproofed. However, the cathode support means may be wetproofed for some embodiments, but is not always to be wetproofed which is referred to herein as "non-wetproofed".

A porous anode cooler plate 26 is secured adjacent the anode support means, such as adjacent the anode substrate 20 as shown in FIG. 1. The plate 26 defines a plurality of fuel channels 28A, 28B, 28C, 28D on a first surface 30 of the plate 26 and a plurality of coolant channels 32A, 32B, 32C, 32D on an opposed second surface 34 of the plate. The cooler plate 26 is secured to the anode support means so that the fuel channels 28A, 28B, 28C, 28D are adjacent the anode support means, such as adjacent the anode substrate 20. An impervious separator plate 36 is secured adjacent the coolant channels 32A, 32B, 32C, 32D of the cooler plate 26, and is dimensioned to overlie the cooler plate 26 so that any fluid coolant or reactant is prohibited from moving from the cooler plate 26 through the separator plate 36.

A porous cathode water management plate 38 defines a plurality of oxidant channels 40A, 40B, 40C, 40D on a first surface 42 of the plate 38 and a plurality of water management channels 44A, 44B, 44C, 44D on an opposed second surface 46 of the plate 38. The water management plate 38 is secured adjacent the cathode support means, such as adjacent the cathode substrate 24 so that the oxidant channels 40A, 40B, 40C, 40D are adjacent the cathode support means, as shown in FIG. 1.

Figure 2:
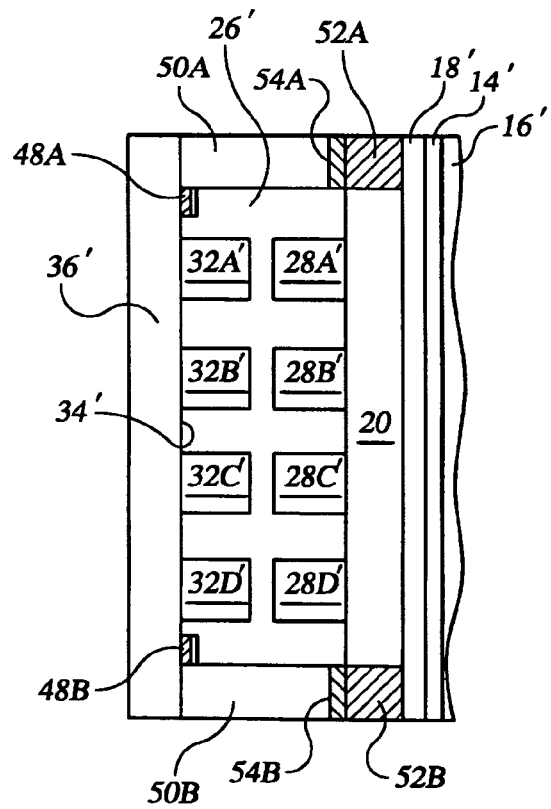
FIG. 2 is a schematic, fragmentary, cross-sectional representation showing a porous anode cooler plate of a fuel cell appropriate for the present invention.

It is important that no fluids such as a coolant or reactant stream pass out of the anode cooler plate 26 except for transfer of reducing fluid fuel between the fuel channels 28A, 28B, 28C, 28D and the porous anode support means, or transfer of condensed water or water vapor between the anode support means or fuel channels and the coolant channels 32A, 32B, 32C, 32D. Consequently, and as shown in FIG. 2, an exemplary anode cooler plate 26' (the prime of the FIG. 1 reference numerals being utilized in FIG. 2 for virtually identical components) has an impervious separator plate 36' completely overlying and extending beyond a peripheral edge of the second surface 34' of the plate 26'. Additionally, a cooler plate peripheral edge seal 48A, 48B, such as a traditional, compressible "O"-ring would be used to further seal the second surface 34A of the plate 26' against loss of fluid except as described. A solid edge seal 50A, 50B would also be secured to a peripheral edge of the plate 26A, consisting of any impervious materials known in the fuel cell art. Similarly, a peripheral edge of the anode support means, such as a peripheral edge 52A, 52B of the anode substrate 20' would have its pores sealed against fluid movement by sealing means known in the art, and the peripheral edges 52A, 52B could also be secured by a peripheral bonded joint 54A, 54B to the adjacent solid edge seals 50A, 50B to further prohibit movement of fluid out of the anode cooler plate 26' other than as described above.

Figure 3:
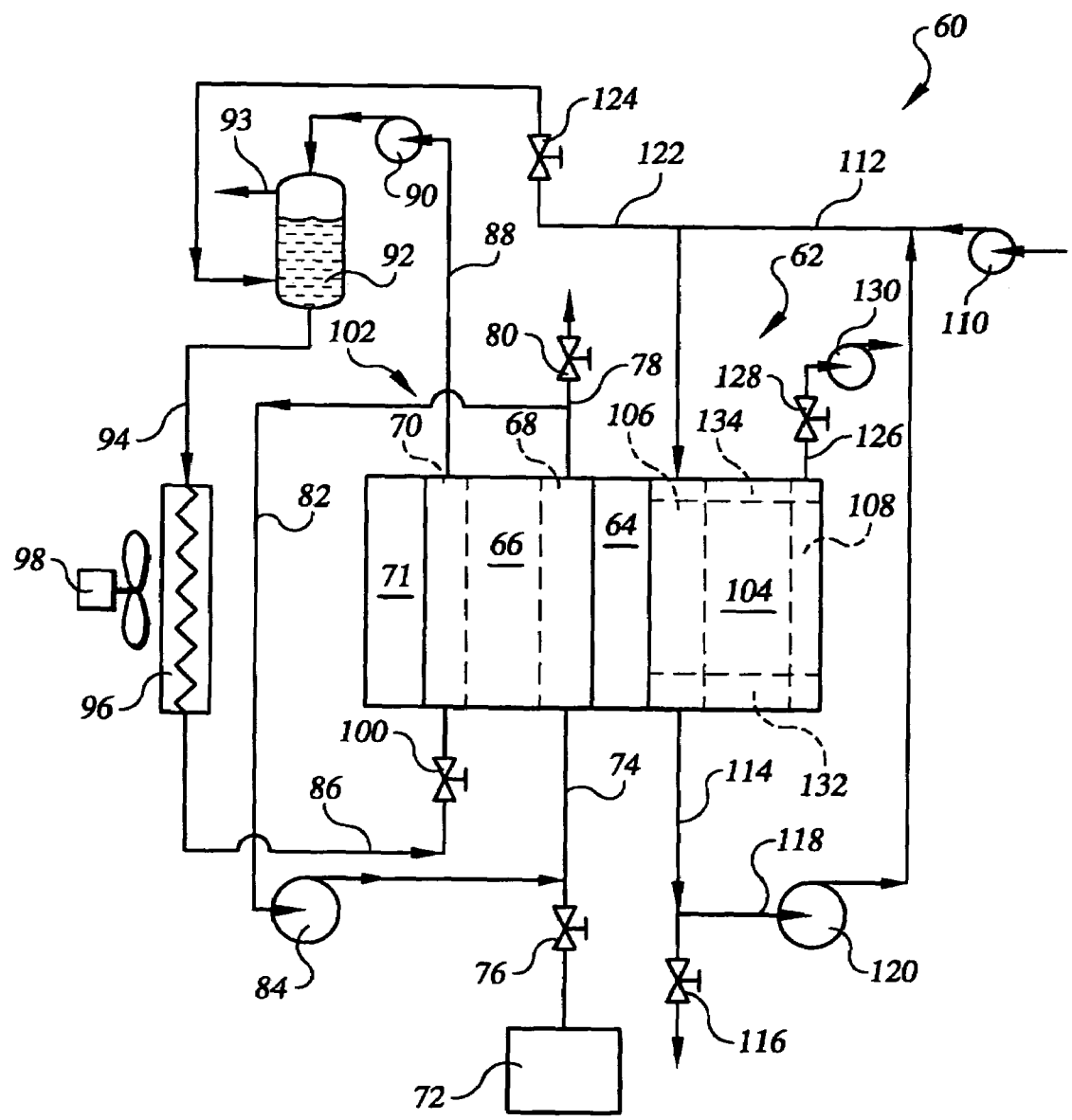
FIG. 3 is a simplified, schematic representation of a direct antifreeze cooled fuel cell power plant with passive water management constructed in accordance with the present invention.

FIG. 3 shows a direct antifreeze cooled fuel cell power plant with passive water management of the present invention and is generally designated by the reference numeral 60. The power plant includes a fuel cell 62 having a membrane electrode assembly 64 ("MEA") such as known in the art and including an electrolyte secured between anode and cathode catalysts and a wetproofed anode support means and a cathode support means, as described above. An anode cooler plate 66 is secured adjacent the MEA 64 defining at least one fuel channel 68 and at least one coolant channel 70 for directing a reducing fluid fuel and a direct antifreeze solution respectively through the channels 68, 70. A separator plate 71 as described above is secured to the anode cooler plate 66 adjacent the coolant channel 70 of the plate 66. A reducing fluid source 72 such as a pressurized hydrogen gas vessel stores the reducing fluid fuel, and a reducing fluid feed line 74 and fuel inlet valve 76 on the line 74 selectively control a rate and pressure of delivery of the fuel to the fuel channel 68. A fuel discharge line 78 and a fuel discharge valve vent 80 on the line 78 selectively restrict passage of the reducing fluid out of the fuel channel 68 to thereby control the pressure of the fuel within the fuel channel 68, and the fuel discharge vent valve 80 also selectively discharges the fuel out of the plant 60 in a manner known in the art.

A fuel recycle line 82 may be secured between the fuel discharge line 78 and feed line 74 to recycle a portion of the exhausted reducing fluid fuel back into the fuel channel 68, and a fuel recycle blower 84 may be secured to the fuel recycle line 82 to control a rate of recycling of the fuel in a known manner.

A coolant feed line 86 directs flow of a direct antifreeze solution into the coolant channel 70 of the fuel cell 62, and a coolant outlet line 88 directs the solution from the fuel cell 62 through a coolant pump 90 and into a coolant evaporator 92 that serves to evaporate water within the direct antifreeze solution picked up from the fuel cell 62 such as water vapor or condensed water from the reducing fluid stream passing through the fuel channel 68. An evaporator vent 93 discharges such evaporated water out of the evaporator 92. A first coolant outlet line extension 94 then directs the direct antifreeze solution from the evaporator 92 through a radiator 96 adjacent a fan 98 for cooling of the solution. Then the coolant feed line 86 directs the solution back into the coolant channel 70 to remove heat from the fuel cell 62.

A pressure control valve 100 may be secured to the coolant inlet line 86 up stream of the coolant pump 90 to restrict passage of the direct antifreeze solution through the fuel channel 70, and to thereby reduce the pressure of the solution passing through the fuel channel in a manner known in the art and disclosed in the aforesaid U.S. Pat. No. 6,316,135. The pressure control valve may also be part of a pressure control system integrated by controller means known in the art with the reducing fluid discharge valve 80 to maintain a positive pressure differential between the reducing fluid fuel passing through the fuel channel 68 and the direct antifreeze solution passing through the coolant channel 70. An optimal pressure differential is about 2 pounds per square inch ("p.s.i.") or about 14 kPa. The described components that direct the direct antifreeze solution through the coolant channel 70, coolant pump 90, evaporator 92, radiator 96 and pressure control valve 100 may be understood and described as a coolant loop 102 for circulating the direct antifreeze solution through the anode cooler plate 66.

The power plant 60 also includes a porous cathode water management plate 104 that defines at least one oxidant channel 106 and at least one water management channel 108 defined on opposed surfaces of the plate 104, and the plate is secured so that the oxidant channel 106 is adjacent a cathode support means of the MEA 64, as described above. An oxidant blower 110 variably forces an oxygen containing oxidant source, such as atmospheric air, through an oxidant feed line 112, through the oxidant channel 106, and through an oxidant discharge line 114. An oxidant discharge vent valve 116 variably restricts discharge of the oxidant out of the fuel cell 62, and may be integrated with the pressure control system through controller means known in the art to maintain a positive pressure differential between the oxidant passing through the oxidant channel 106 and fuel cell product water within pores of the cathode water management plate 104 and water within the water management channel 108.

An oxidant recycle line 118 having an oxidant recycle blower 120 may be secured between the oxidant discharge line 114 and the oxidant inlet line 112 to variably recycle a portion of the oxidant back into the oxidant channel 68 in a manner known in the art to assist in humidifying and heating the oxidant from the oxidant blower 110. An oxidant recycle line extension 122 may also direct some of the recycled oxidant into the evaporator 92 through an evaporator oxidant inlet valve 124 to variably direct some of the oxidant through the evaporator 92 in order to assist in evaporating water out of the direct antifreeze solution. A fuel cell water discharge 126 is secured in fluid communication with the water management channel 108 of the cathode water management plate 104 to direct the fuel cell product water out of the fuel cell 62 through a water vent valve 128. The pressure control system may also include a vacuum pump 130 known in the art secured in fluid communication with the water vent valve 128 to provide a positive pressure differential between the oxidant and the water within the pores of the cathode water transport plate 104 and within the water management channel 108.

As is well known in the art, in most operational circumstances the at least one fuel cell 62 shown in FIG. 3 would be integrated with a plurality of similar fuel cells (not shown) to form a cell stack assembly (not shown). In such an assembly, an additional fuel cell would be secured to the fuel cell 62 so that a separator plate (not shown) adjacent an anode cooler plate of the additional fuel cell would be secured adjacent the water management plate 104 of the fuel cell 62 to prohibit movement of any direct antifreeze within the cooler plate of the additional fuel cell from moving into the cathode water management plate 104. For such a fuel cell stack assembly of the present invention there would be at least one impervious plate between adjacent fuel cells.

The water management plate 104 provides several water management functions. The porous water management plate 104 can remove any liquid water, such as condensate or product water, from the cathode support means or the oxidant channel 106, to the water management channel 108 and out of the fuel cell 62 through the fuel cell water discharge 126. This is accomplished by a positive pressure differential of about 2 p.s.i. or about 14.7 kPa between the oxidant channel 106 and the water management channel 108. The water management plate 104 can also serve to redistribute water within the fuel cell 62 from an area with excess water to a water deficient area. This is accomplished by wicking water either through pores defined within the porous water management plate 104, or by flowing water within the water management channel 108, as a result of a capillary pressure driving force.

As seen in FIG. 3, as the oxidant stream moves through the oxidant channel 106 within the cathode water management plate 104 from the oxidant feed line 112 toward the oxidant discharge line 114, the oxidant will become increasingly saturated with water vapor from the cathode support means of the MEA 64 and with entrained water droplets of fuel cell product water. Therefore, a condensation zone 132 is effectively formed within the plate 104 adjacent the oxidant discharge line 114 where liquid water condenses out of the saturated oxidant stream. That condensed water then moves by capillary action through the pores of the cathode water management plate 104 and its water management channel 108 toward an evaporation zone 134 of the plate 104 adjacent the oxidant feed line 112. The evaporation zone releases water to the drier oxidant just entering the water channel 106 from the oxidant feed line 112. By humidifying the incoming oxidant stream within the evaporation zone 134, water loss from adjacent portions of the cathode support means and a PEM electrolyte of the MEA 64 will also be minimized. Thus, the porous water management plate 104 serves to passively manage water by both removal of product water and also by humidification of reactant streams and the MEA 64.

In operation of fuel cells disclosed in the aforesaid "direct antifreeze" patents and application, movement of fuel cell product water from the cathode catalyst through a "cathode support means" and into an adjacent "porous cooler plate" provides a liquid water pathway between the fuel cell catalysts and the direct antifreeze within the porous cooler plate. It is suspected that the direct antifreeze ultimately diffuses through that liquid water pathway to contact and poison the cathode catalyst, thereby decreasing fuel cell performance. By the present invention, no direct antifreeze coolant is directed to flow through the cathode water management plate 104, so the direct antifreeze cannot poison the cathode catalyst of the MEA 64. Also, because no direct antifreeze passes through the cathode water management plate 104, the adjacent cathode support means of the MEA 64 does not have to be wetproofed resulting in higher power density of the fuel cell 62. The present invention also achieves a reduction in dehydration of the cathode support means by any direct antifreeze solutions. Therefore, the need for humidification of the cathode support means is reduced over known direct antifreeze solution fuel cells.

In the present invention, the direct antifreeze solution passes only through the coolant channel 70 of the anode cooler plate 66, and is isolated from any adjacent fuel cells within a fuel cell stack assembly by the separator plate 71. The direct antifreeze solution is also isolated from the anode catalyst of the MEA 64 by the wetproofing of the anode support means of the MEA 64 and by the effect of the positive pressure differential between the reducing fluid fuel passing through the fuel channels and pores of the anode support means and the direct antifreeze solution within the coolant channel 70. Unlike the cathode side of the MEA 64, no fuel cell product water is generated adjacent the anode catalyst of the MEA 65. Therefore, there is no liquid pathway for diffusion of the direct antifreeze from the anode cooler plate 66 into catalysts of the MEA 64.

As disclosed in the above cited Patents and Patent Application, a direct antifreeze solution appropriate for use in the present invention may be any organic antifreeze solution that does not wet the wetproofed anode support means and that is essentially non-volatile at cell operating temperatures. For purposes herein, "non-volatile" is defined to mean that the direct antifreeze solution sustains a loss of less than 10% of its direct antifreeze for every 500 operating hours of the fuel cell 62 at fuel cell operating temperatures. Alternatively, a first preferred direct antifreeze solution may be a special direct antifreeze solution having the following characteristics: 1. a freezing point of at least −20 degrees Fahrenheit (hereafter "° F.") or at least −28 degrees centigrade ("° C."); 2. a surface tension greater than 60 dynes per centimeter (hereafter "dyne/cm") at about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The alkanetriol direct antifreeze may be an antifreeze solution containing any alkanetriol.

A further preferred direct antifreeze solution as disclosed in the aforesaid U.S. Patent Application is a high molecular weight direct antifreeze that is preferably a polyethylene glycol having a molecular weight ranging from 200 to 8,000 atomic mass units (hereafter "AMU"). The high molecular weight direct antifreeze may also be selected from the group consisting of ethylene oxide chains terminated by functional alkyl and/or hydroxyl groups, linear alcohols, branched alcohols, polyethylene glycols, methoxypolyethylene glycols, dimethoxypolyethylene glycols, triethylene glycols, and tetraethylene glycols, and mixtures thereof, each member of the group having a molecular weight ranging from 400 to 8,000 AMU. For purposes herein, the phrase "direct antifreeze solution" is meant to include all of the aforesaid direct antifreeze solutions.

As can be appreciated, the direct antifreeze cooled fuel cell power plant with passive water management 60 of the present invention achieves efficient cooling of the fuel cell 62 by the direct antifreeze solution without need for retaining a large volume of water. Therefore, no freeze tolerant accumulator is needed for conditions wherein the ambient temperature is below the freezing temperature of water. By decreasing the volume of pure water resident in the plant, heat-up time and energy required to start-up the plant 60 in freezing conditions is reduced. Reduced pure water volume also reduces risk of mechanical damage due to freezing of water during shut down in freezing conditions. Additionally, no mechanical pump is needed for circulating product water as in known "direct antifreeze" fuel cell power plants-because the cathode water management plate 104 passively removes product water out of the plant and also serves to humidify the reactant streams and the MEA 64.

All of the aforementioned U.S. Patents and U.S. Patent Application are incorporated herein by reference.

While the present invention has been disclosed with respect to the described and illustrated embodiments of the direct antifreeze cooled fuel cell power plant with passive water management 60, it is to be understood that the invention is not to be limited to those embodiments. Accordingly, reference should be made primarily to the following claims rather than the foregoing description to determine the scope of the invention.

What is claimed is:

1. A fuel cell power plant (60) for generating electrical current from reducing fluid fuel and oxygen containing oxidant reactant streams, comprising:
   a. at least one fuel cell (10, 62) having an electrolyte (12) secured between an anode catalyst (14) and a cathode catalyst (16), a wetproofed anode support means (20) secured in direct fluid communication with the anode catalyst (14) for passing the fuel reactant stream adjacent the anode catalyst (14), and a cathode support means (24) secured in direct fluid communication with the cathode catalyst (16) for passing the oxidant reactant stream adjacent the cathode catalyst (16);
   b. a porous anode cooler plate (26) defining a plurality of fuel channels (28A, 28B, 28C, 28D) on a first surface (30) and a plurality of coolant channels (32A, 32B, 32C, 32D) on an opposed second surface (34) of the cooler plate (26), the plate being secured adjacent the anode support means (20) so that the fuel channels (28A, 28B, 28C, 28D) are adjacent the anode support means (20);
   c. a direct antifreeze solution passing through the coolant channels (32A, 32B, 32C, 32D) for cooling the fuel cell (10);
   d. a separator plate (36) secured adjacent the coolant channels (32A, 32B, 32C, 32D) of the anode cooler plate (26) for prohibiting movement of the direct antifreeze solution through the separator plate (36), said separator plate (36) being impervious to fluid coolant or reactant;
   e. a porous cathode water management plate (38) defining a plurality of oxidant channels (40A, 40B, 40C, 40D) on a first surface (42) and a plurality of water management channels (44A, 44B, 44C, 44D) on an opposed second surface (46) of the water management plate (38), the water management plate (38) being secured adjacent the cathode support means (24) so that the oxidant channels (40A, 40B, 40C, 40D) are adjacent the cathode support means (24) and so that fuel cell (10) water flows through the cathode support means (24) and into and through pores and the water management channels (44A, 44B, 44C, 44D) of the plate (38), the water management channels (44A, 44B, 44C, 44D) being in fluid communication with a fuel cell water discharge (126) for discharging water out of the fuel cell (10); and,
   f. pressure control means for maintaining a positive pressure differential between the fuel stream passing through the fuel channels (28A, 28B, 28C, 28D) and the direct antifreeze solution passing through the coolant channels (32A, 32B, 32C, 32D) of the anode cooler plate, and between the oxidant stream passing through the oxidant channels (40A, 40B, 40C, 40D) and the product water passing through the pores of the water management plate (38).

2. The fuel cell power plant (60) of claim 1, further comprising a coolant loop (102) through which the direct antifreeze solution circulates, including a coolant outlet line (88) that directs the direct antifreeze solution from the coolant channels (32A, 32B, 32C, 32D) through a coolant pump (90), a coolant evaporator (92), a radiator (96) to remove heat from the direct antifreeze solution, and through a coolant feed line (86) back into the coolant channels (32A, 32B, 32C, 32D) of the anode cooler plate (26).

3. The fuel cell power plant (60) of claim 2 further comprising an oxidant recycle line (118) secured in fluid communication between an oxidant discharge line (114) that discharges oxidant from the oxidant channels (40A, 40B, 40C, 40D) and the coolant evaporator (92) for directing heated oxidant from the fuel cell (62) to the evaporator (92) to assist in evaporating water from the direct antifreeze solution.

4. The fuel cell power plant (60) of claim 1, wherein at least one water management channel (108) is defined within the cathode water management plate (104) to extend between a condensation zone (132) adjacent an oxidant discharge line (114) and an evaporation zone (134) adjacent an oxidant feed line (112) to direct flow of water from the condensation zone (132) to the evaporation zone (134).

5. The fuel cell power plant (60) of claim 1, further comprising a cooler plate peripheral edge seal (48A, 48B) secured between a peripheral edge of the second surface (34') of the anode cooler plate (26') and the separator plate (36'), a solid edge seal (50A, 50B) secured between the separator plate (36') and the anode support means (20') and overlying a peripheral edge of the anode cooler plate (26'), and an anode support peripheral edge seal (52A, 52B) to prohibit movement of the direct antifreeze solution through the peripheral edge of the anode cooler plate (26') or through the peripheral edge of the anode support means (20').

6. The fuel cell power plant (60) of claim 1, further comprising a plurality of the at least one fuel cells (10, 62) cooperatively disposed to form a fuel cell stack assembly and having a separator plate (36, 71) secured adjacent the coolant channels (32A, 32B, 32C, 32D, 70) of the anode cooler plate (26, 66) of each fuel cell (10, 62) and secured between each adjacent fuel cell (10, 62) of the cell stack assembly.

7. The fuel cell power plant (60) of claim 1, wherein the cathode support means (24) is selected from the group consisting of a wetproofed cathode support means and a non-wetproofed cathode support means.

\* \* \* \* \*